Jan. 4, 1966 B. R. HOWARD ETAL 3,226,844

DECODING APPARATUS

Filed March 28, 1961 5 Sheets-Sheet 1

INVENTORS
BARNEY RAY HOWARD
JOHN V. HAUNSPERGER
JOHN A. WINSKOWICZ

BY Harold E. Simmons
ATTORNEY

Jan. 4, 1966 B. R. HOWARD ETAL 3,226,844

DECODING APPARATUS

Filed March 28, 1961 5 Sheets-Sheet 2

INVENTORS
BARNEY RAY HOWARD
JOHN V. HAUNSPERGER
JOHN A. WINSKOWICZ

BY Harvey E. Simmons
ATTORNEY

DECODING APPARATUS

Filed March 28, 1961 5 Sheets-Sheet 3

INVENTORS
BARNEY RAY HOWARD
JOHN V. HAUNSPERGER
JOHN A. WINSKOWICZ

BY Naven E. Simmons
ATTORNEY

INVENTORS

BARNEY RAY HOWARD

JOHN V. HAUNSPERGER

JOHN A. WINSKOWICZ

BY [signature]

ATTORNEY

INVENTORS
BARNEY RAY HOWARD
JOHN V. HAUNSPERGER
JOHN A. WINSKOWICZ
BY Harold E. Simmons
ATTORNEY 3,226,844
Patented Jan. 4, 1966

3,226,844
DECODING APPARATUS

Barney Ray Howard and John V. Haunsperger, Cedar Rapids, Iowa, and John A. Winskowicz, Danvers, Mass., assignors, by mesne assignments, to Le Febure Corporation, Cedar Rapids, Iowa, a corporation of Iowa Filed Mar. 28, 1961, Ser. No. 98,949
17 Claims. (Cl. 35—3)

The present invention concerns decoding apparatus, particularly apparatus for decoding visual matter which has been encoded according to the teachings of U.S. Patent 2,952,080, dated September 13, 1960, and most particularly to apparatus for use in banks for decoding the signatures of depositors which have been encoded into passbooks in the form described in the aforesaid patent.

Patent 2,952,080 reveals a method for encoding and decoding visual matter, the gist of which is that certain predetermined portions of the matter are removed or blanked out, the remainder, however, by itself being sufficient to render the matter intelligible, and replaced with "dummy" or "nonintelligible" matter. Certain apparatus for performing that method is also described in the aforesaid patent, principally the "master encoder" or encoding screen and the "reader" or decoding screen. The construction and operation of these two screens are sufficiently detailed in that patent that they need not be repeated here.

One important application of the foregoing method and apparatus is in banks, particularly savings banks which employ passbooks in which deposits and withdrawals are recorded. The passbook is presented at the bank accompanied by a deposit or withdrawal slip, as the case may be, signed by the customer. Particularly in the case of withdrawals it is necessary for the clerk or teller to compare the signature on the withdrawal slip with that on the signature card maintained by the bank. Obviously, this is time consuming because it requires the teller to take the slip to the signature records of the bank, compare the signature on the slip with that on the signature card and then, if satisfied, to return and make the withdrawal. Using the method and apparatus of the aforesaid patent the customer's signature is encoded directly in the passbook where it is unintelligible to all except the teller when the book is placed in the decoding or reader apparatus. The teller, therefore, can compare the signature encoded in the passbook directly and quickly with that on the withdrawal slip so that the chance of unauthorized withdrawals is virtually eliminated. This arrangement is of particular importance in savings banks which have many branches, for generally each branch does not possess signature cards for other than its own depositors so that one of the latter from another branch is usually not permitted to withdraw funds simply because there is no quick way of ascertaining his identity. When, however, his signature is encoded in his passbook in the manner described in the aforesaid patent, these difficulties largely vanish and there is no longer any obstacle to a depositor in one branch of a savings bank conveniently withdrawing funds from another.

The apparatus of the present invention is designed particularly for use with passbooks or the like in banks, although it will be apparent that it is equally applicable for use with other forms of matter encoded according to the teachings of a foresaid patent. When a new account is opened the customer affixes his signature to a signature card of the usual kind. The latter is then placed in conjunction with an encoding screen of the kind described in the aforesaid patent and the two are photographed so that a print is thereby produced of the scrambled signature. The print is then bonded to the passbook, generally on the inside of the rear cover which is provided with a pair of spaced initial aligning apertures therein. Alternately, the customer may simply affix his signature to the cover and a transparent print of the encoding screen is bonded thereover. The passbook is then placed in what is called a "master reader" containing a suitable decoding screen; the apertures in the passbook are engaged by a pair of aligning pins having a fixed reference to the reading screen; and the latter is then placed over the encoded signature in order to ascertain whether the alignment of the passbook produced by the pins relative to the screen is accurate in order best to decode the signature. If it is not, means are provided for moving the passbook horizontally and/or vertically and also skewing it until a registry of the passbook with the decoding screen has been obtained which gives a "maximum read." Finally, a pair of punches provides a second or final set of spaced aligning apertures in the passbook which is then removed from the master reader ready for use.

Each teller is provided with what is called a "teller reader" containing a decoding screen identical with that in the master reader and a pair of aligning pins adapted to engage the final set of apertures in the passbook so that when the latter is covered by the decoding screen there will be a proper alignment between the two. The position of the decoding screen in each teller reader relative to the aligning pins thereof is carefully adjusted beforehand to be the same as that of the reading screen in the master reader to the punches thereof. In this manner, therefore, any passbook which has been aligned in the master reader will automatically be aligned in each teller reader. In order to compensate for any possible misalignment, particularly that owing to use and wear of the passbook, each teller reader also incorporates means for moving the passbook horizontally and/or vertically as well as skewing it relative to the screen.

It will, therefore, be understood that each bank or branch is provided with one master reader and several teller readers depending upon the number of tellers employed. Both the master and teller readers of the present invention are essentially alike insofar as the mechanism for bringing the reading screen into contact with the encoded signature, and that for horizontal, vertical and skew adjustment are concerned. Each employs a rectangular carrier or frame to which the decoding screen is clamped. The carrier is hinged at its bottom edge to be movable relative to a pressure plate against which the passbook cover containing the encoded matter is placed. The pressure plate is provided with a surface to grip the passbook so that it can be moved relative to the screen by movement of the plate, and is mounted on two sets of trunnions, each movable at right angles with respect to the other in order to provide vertical and horizontal adjustment of the passbook relative to the screen. In addition, the pressure plate also is rotatable on an axis carried by one set of the trunnions in order that it may skew the passbook relative to the encoding screen. In the master reader a manually operated mechanism moves the initial aligning pins to engage the initial apertures in the passbook and also rotates the carrier to compress the passbook. The punches are likewise operable by a mechanism which also releases the passbook after the final aligning apertures have been punched therein. In the teller reader the aligning pins, which are identical in size and spacing with the punches of the master reader, engage the second or final set of aligning apertures in the passbook as the carrier is being rotated to compress the passbook between the screen and the pressure plate. The operation of the aligning pins and the screen carrier, in the case of the teller reader, is controlled by an arrangement of solenoids and switches so that insertion of the passbook between the screen and the plate causes the switches to be closed in a predetermined sequence in order to operate the reader automatically, except to the extent manual adjustment of the plate may be needed to correct any misalignment caused by wear of the passbook.

Finally, a particular form of passbook is provided for use with the readers having a pair of spaced initial aligning apertures in one cover thereof so that when the encoded signature is affixed thereto and the passbook is placed in the master reader, an initial or trial alignment of the passbook with the decoding screen can be easily and rapidly achieved.

It is, therefore, the chief object of the present invention to provide reader apparatus for use with a decoding screen and with a sheet containing encoded matter of the kind described for quickly bringing the screen into decoding contact with the sheet and accurately aligning the matter thereon with the screen so that it may be decoded.

Another object is the provision of a reader incorporating a decoding screen carrier and a passbook support, together with apparatus both to move the carrier and support relative to each other to compress a passbook page containing encoded matter of the kind described therebetween for decoding and also to engage the page for insuring its alignment with the decoding screen upon compression of the page between the screen and the support.

A further object of the present invention is to provide a reader incorporating a decoding screen carrier and a passbook support, together with apparatus to move the carrier relative to the support in order to compress a passbook page containing encoded matter of the kind described therebetween for decoding and an aligning mechanism which first initially aligns the page relative to the screen upon its insertion between the latter and the pressure plate and then permits a further or final alignment after compression of the page between the screen and the plate.

Another object of the present invention is the provision of a master reader of the kind described incorporating a punch assembly to produce a final set of aligning apertures in a passbook containing encoded matter of the kind described after the passbook has been finally aligned with the decoding screen.

A still further object of the present invention is the provision of a teller reader of the kind described having an arrangement of solenoids and switches to close the screen carrier in order both to compress the passbook and to cause engagement of the latter with an aligning mechanism for the purpose of insuring alignment of the passbook when compressed between the decoding screen and the pressure plate.

An additional object of the present invention is the provision of a passbook for use with readers of the kind described having aligning apertures therein to cooperate with the master reader to produce an initial alignment of encoded matter of the kind described in the passbook with the decoding screen in the master reader.

Other and further objects, features and advantages of the present invention will become apparent upon consideration of the preferred form thereof, hereafter described, read in conjunction with the drawings, in which.

Figure 1:
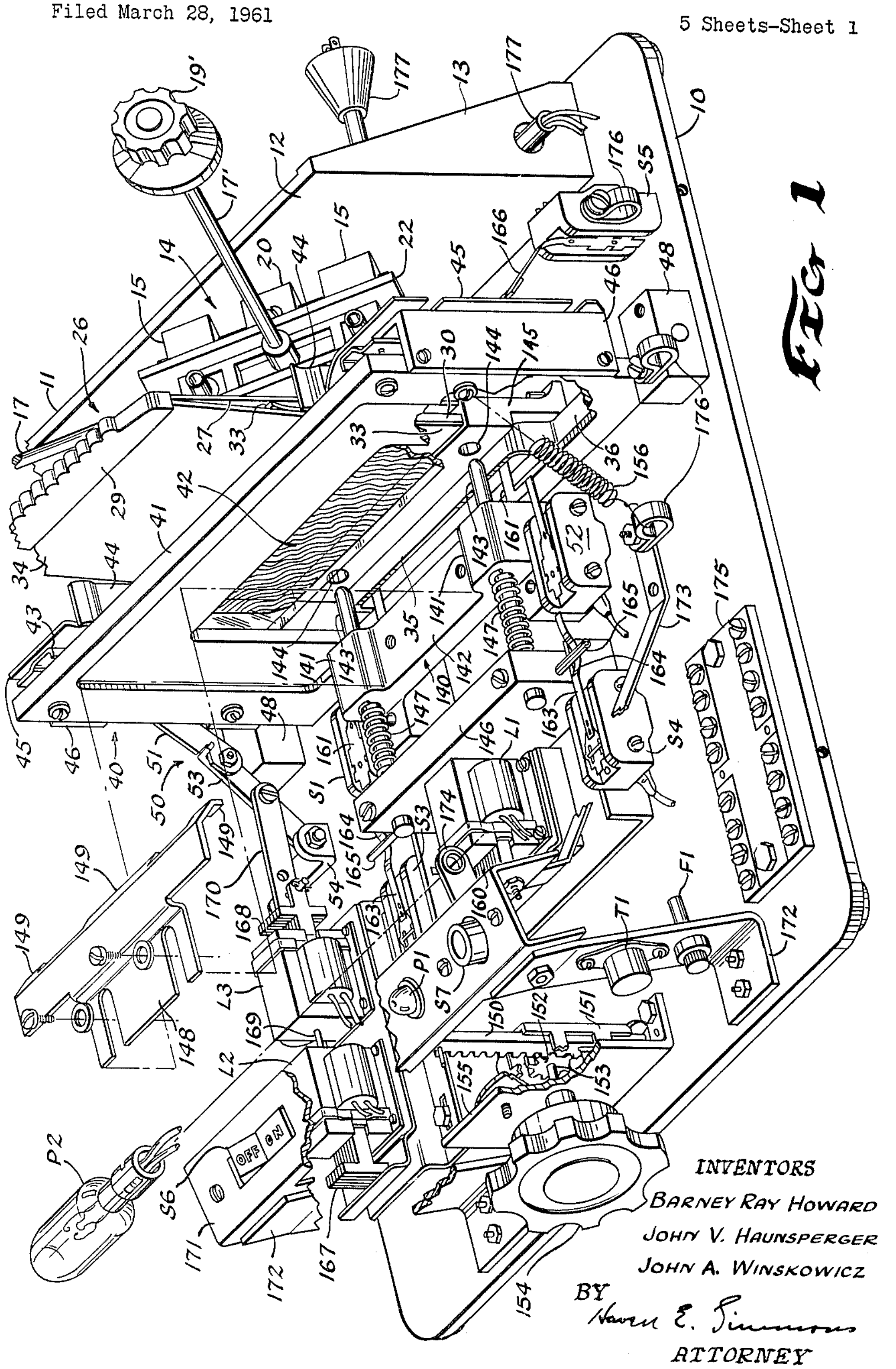
FIGURE 1 is an upper perspective view, with the cover removed, of a teller reader according to the present invention.

Since, as has been pointed out in the foregoing general description of the invention, a large portion, namely the screen carrier, pressure plate and manually operated final aligning mechanisms, of both the master and teller readers is identical, common components are employed for both for which identical reference numerals are therefore used in the following detailed descriptions.

*Final aligning, pressure plate and decoding screen sub-assemblies*

Figure 2:
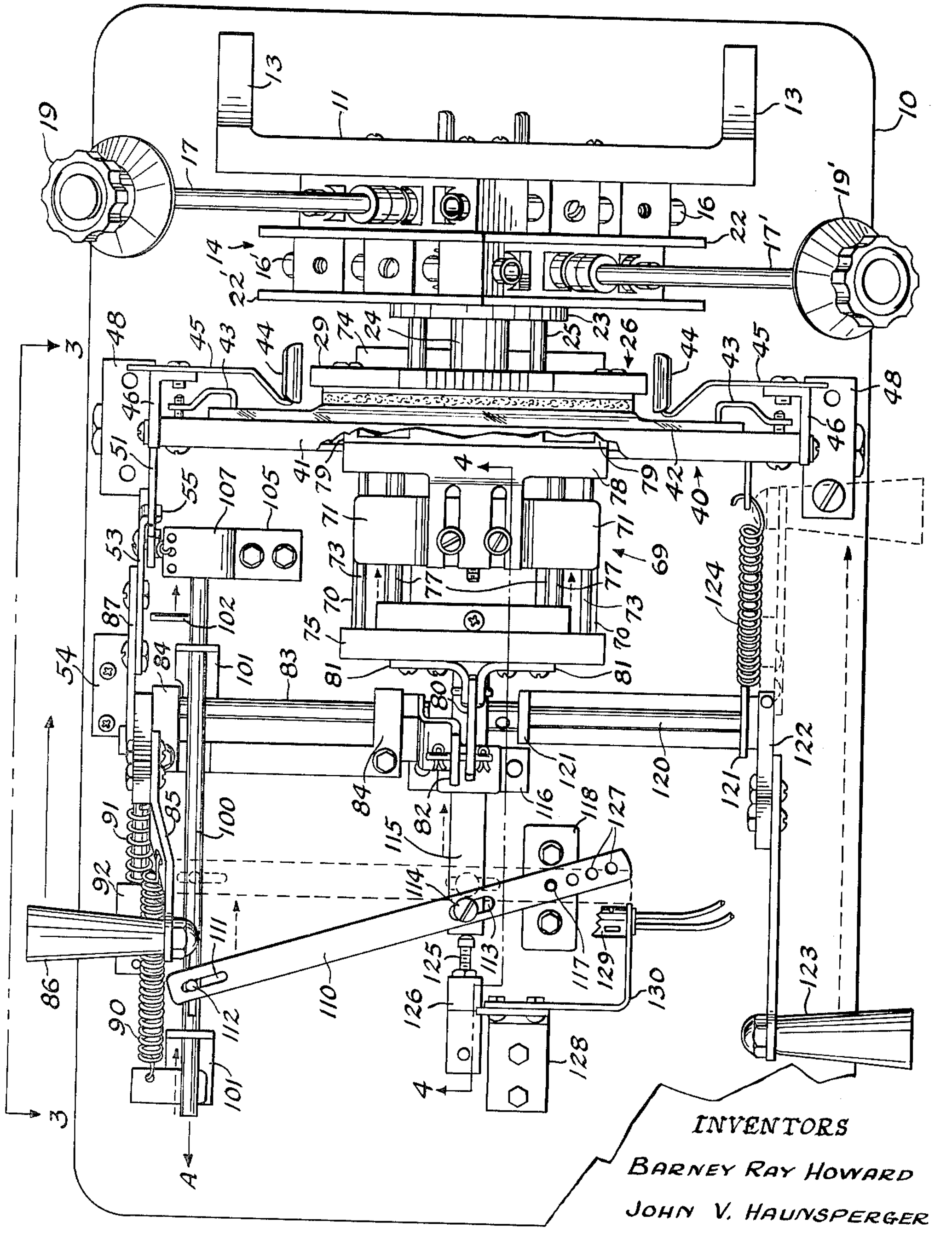
FIGURE 2 is a plan view, with the cover removed, of a master reader according to the present invention.
Figure 3:
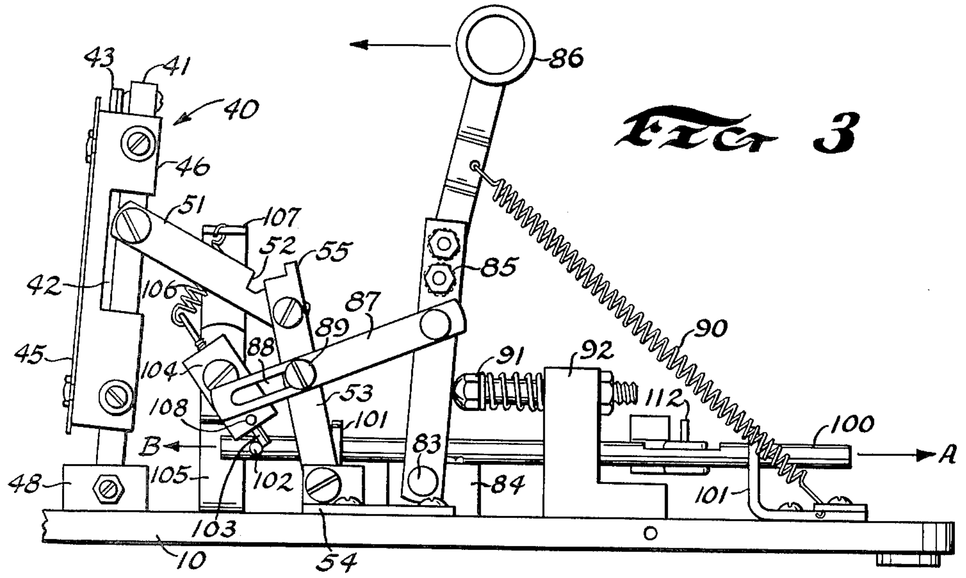
FIGURE 3 is a detail view in elevation taken along the line 3—3 of FIGURE 2.
Figure 4:
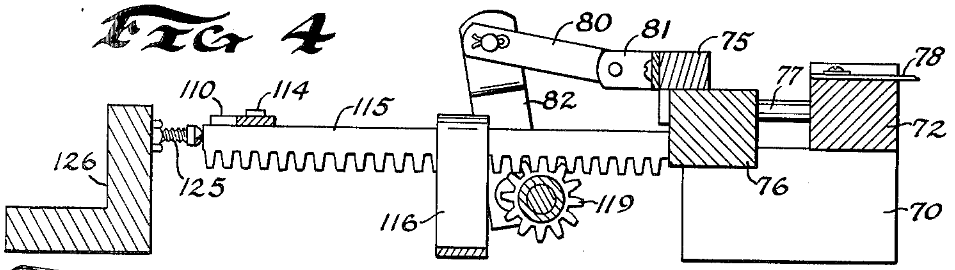
FIGURE 4 is a detail view in elevation taken along the line 4—4 of FIGURE 2.
Figure 8:
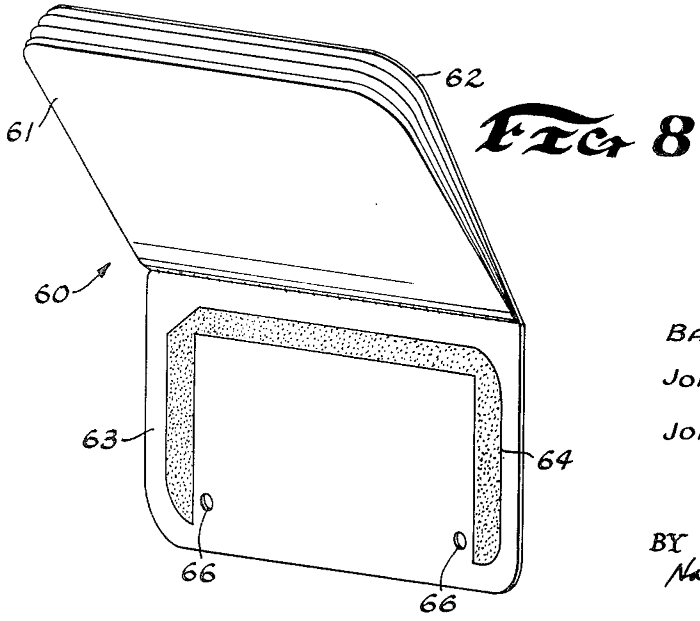
FIGURE 8 is a perspective view of the inside rear cover of a passbook for use with a master reader of the present invention.
Figure 5:
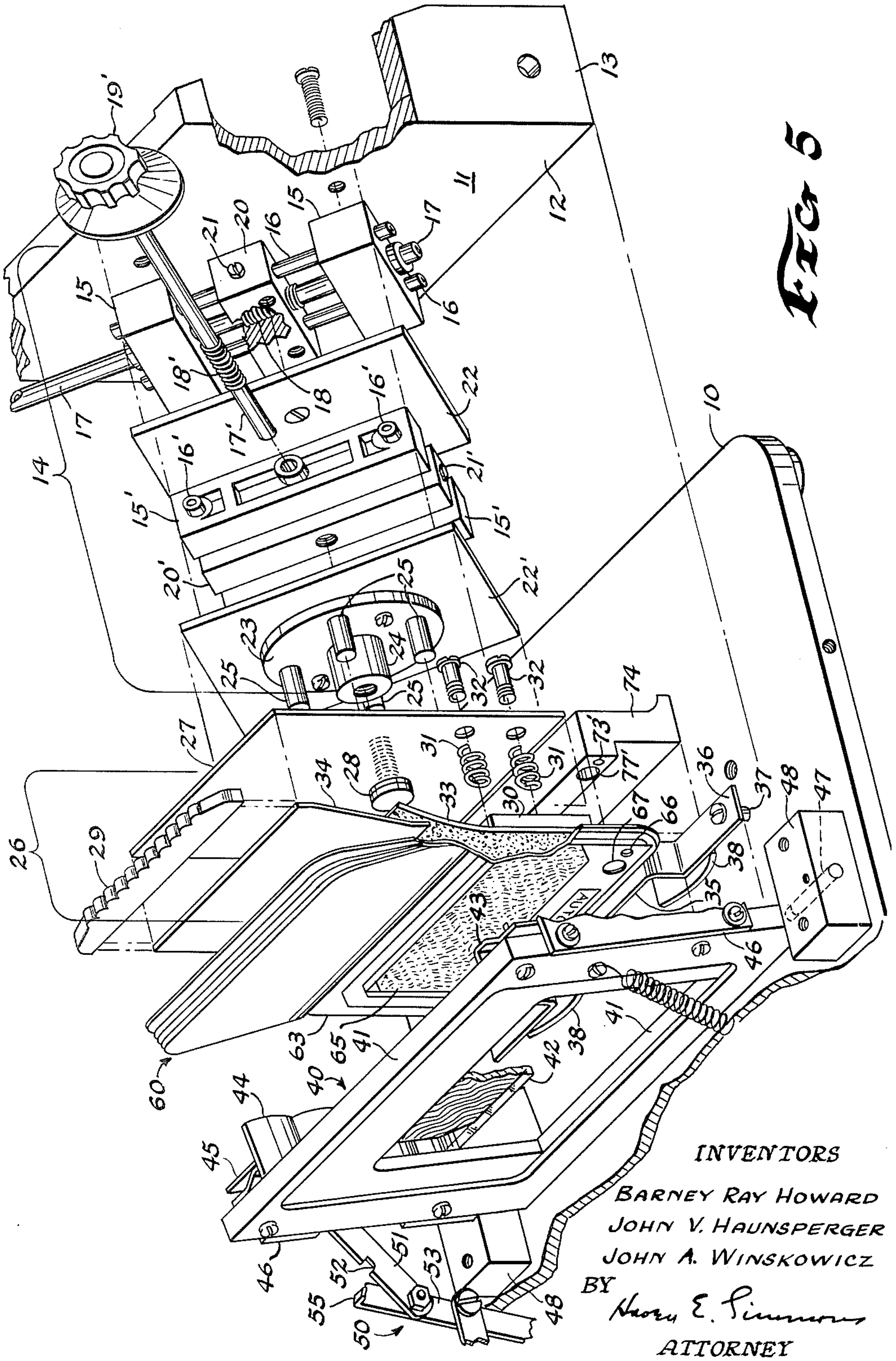
FIGURE 5 is an exploded, upper perspective view of the manual adjustment mechanism for the pressure plate assembly of both the master and teller readers.
Figure 6:
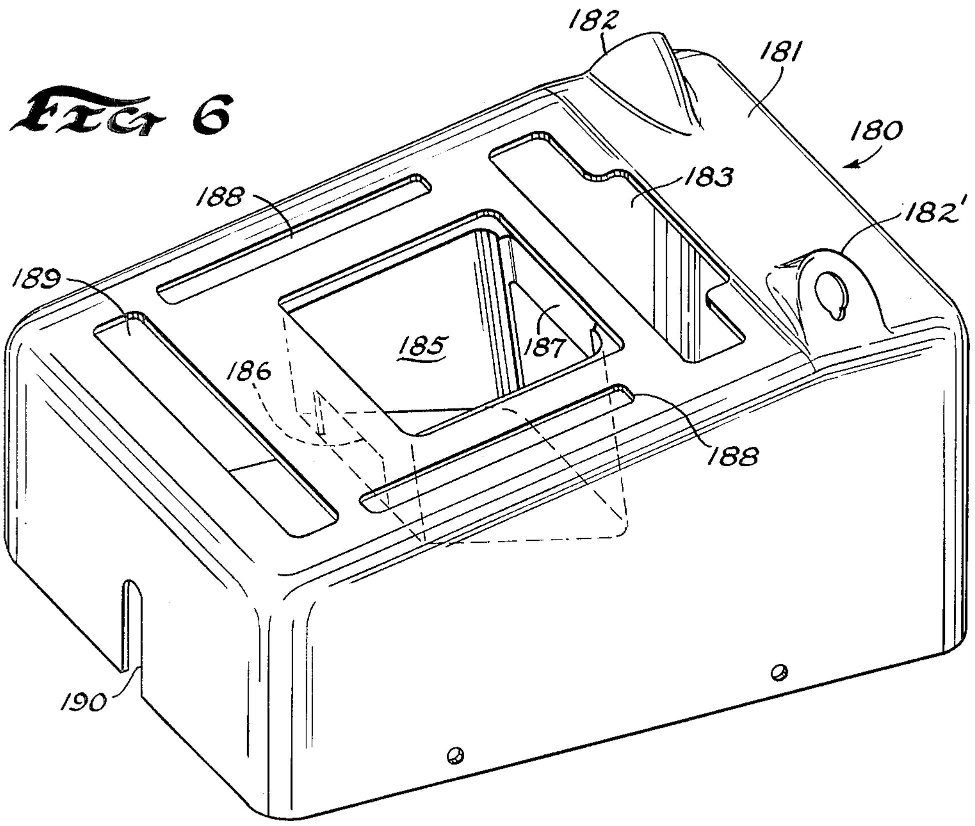
FIGURE 6 is a top perspective view of the cover or housing for both the master and teller readers.

Referring first to FIGURES 1, 2 and 5, the components of all the foregoing sub-assemblies for each of the master and teller readers are mounted in each case upon a rectangular base plate 10 to which is secured across one end thereof a final aligning mount 11 having a rectangular front face 12 perpendicular to base 10 and rearwardly extending support flanges 13 integral therewith. To face 12 is fastened the manual final aligning assembly generally designated at 14. The latter comprises two spaced trunnion mounts 15 in the form of identical rectangular blocks of nylon or other suitable material secured parallel to each other at an incline on face 12 and provided with a set of three parallel bores at right angles to and through their respective side faces, the two outer bores receiving a pair of trunnions 16 just axially slideable therein and the middle bore having journaled therein an adjusting screw 17 threaded at 18 midway between trunnion mounts 15 and extended upwardly therefrom to be capped by an adjusting knob 19. The threaded portion 18 of screw 17 engages the internal threads of a mounting plate carrier 20, identical with trunnion mounts 15 and slideable on face 12 therebetween. Trunnions 16 also pass through suitable bores in carrier 20 and are secured thereto by set screws 21 or similar means. To the outer vertical face of carrier 20, in turn, there is secured one face of a mounting plate 22 which is slideable on the outer vertical faces of trunnion mounts 15 and to whose other face is secured a second pair of spaced trunnion mounts 15', identical with mounts 15 and secured in identical manner but at right angles thereto. Trunnion mounts 15' are similarly bored to receive trunnions 16' and adjusting screw 17' threaded at 18' midway between mounts 15' and capped by knob 19'. Screw 17' likewise engages a second plate carrier 20' like plate carrier 20, slideable on plate 22 between mounts 15' and secured to trunnions 16' by set screws 21'. To the outer vertical face of carrier 20' is secured the back face of a second mounting plate 22' likewise slideable on the outer vertical faces of mounts 15'. The front face of plate 22' is provided with a pressure plate mounting assembly in the form of a flat disc 23 from which projects a central mounting stool 24 and several supporting stools 25 spaced thereabout, all having their outer ends flush with that of stool 24 in order to form a broad base, parallel to face 12 and plates 22 and 22' and thus perpendicular to base 10, for the pressure plate assembly generally designated at 26.

The latter comprises a tall, rectangular pressure plate 27, rotatable about screw 28 securing it against stools 24 and 25 in a plane also perpendicular to base 10, and capped at its upper edge by an operating grip 29. Spaced outwardly from the lower portion of the front face of pressure plate 27 and parallel thereto a passbook cushion 30, in the form of a rectangular, nonmetallic block centrally located with respect to the axis of plate 27, is resiliently suspended relative to plate 27 by compressible coil springs 31, encompassing mounting screws 32, and interposed between the opposing faces of plate 27 and cushion 30. The outer face of cushion 30 is made extensive enough to afford support for the entire area of the encoded matter to be read or decoded from the passbook and it and plate 27 are each slightly narrower than the width of the passbook cover to be supported thereagainst. Cushion 30 is provided with a covering 33 of a material, such as that sold under the trademark "Scotchgrip," capable of frictionally gripping the back face of a passbook when pressed thereagainst. One end of covering 33 is attached to the lower edge of cushion 30 and extends above the latter where its entire width is engaged and pressed toward plate 27 by the lower end of spring plate 34 secured at its upper end to pressure plate 27, thus insuring that covering 33 is maintained taut over the face of cushion 30 and providing easy replacement thereof. An inverted U-shaped, depressable floor plate 35, provided in order to support the passbook at a proper height in front of cushion 30 is fashioned from thin, flexible metal with horizontally extending tabs 36 and is resiliently suspended from the latter just in front of and partly under cushion 30 by stools 37 secured to base 10. The resiliency of floor plate 35 is further enhanced and controlled by a pair of crescent shaped leaf springs 38 attached at one end to tabs 36 and extending downwardly therefrom toward each other so that their crescent portions rest slideably upon base 10.

The decoding screen assembly, generally indicated at 40, is composed of a rectangular compressor frame or screen carrier 41 of substantially greater width than pressure plate assembly 26 and which may be cast of any suitable material such as aluminum. The aperture in frame 41 is somewhat greater in width than decoding screen 42 and of substantially greater height so that when screen 42 is adjustably secured thereacross on the inner face of frame 41 opposite cushion 30 by clamps 43 along the sides of frame 41, a space remains between the bottom of screen 42 and the bottom of frame 41. In the present application the actual decoding screen in the form described in the aforesaid patent is suitably affixed to the back face of a much wider and longer glass plate; "decoding screen 42," as used herein, will refer therefore to the actual decoding screen as affixed to the glass plate. Just inside of clamps 43, a pair of vertically opposed, flat spring passbook guides 44 of undulating configuration are provided in order to support the passbook laterally when inserted behind screen 42. Guides 44 are spaced apart just enough to lightly engage the edges of the passbook inserted therebetween and are supported by wings 45 formed integral therewith extending outwardly parallel with screen 42 to the side edges of frame 41 where they are secured to angles 46 in turn affixed to the edges of frame 41. At the bottom of the side edges of frame 41, a pair of axially aligned trunnions 47 extend outwardly therefrom and are journaled in a pair of pillow blocks 48 secured to base 10 so that when frame 41 is rotated to a perpendicular position relative to base 10 the back face of screen 42 bears against cushion 30 (see FIGURES 2 and 5), guides 44 then straddling pressure plate assembly 26. The perpendicular position of screen assembly 40 is hereafter referred to as its "closed position" and that when rotated on trunnions 47 away from pressure plate assembly 26 as its "open position." To maintain screen assembly 40 in its closed position a toggle linkage 50 extends from one side of frame 41 forward to base 10. One end of upper arm 51 of toggle 50 is hinged to frame 41 and provided with a notch 52 in its upper edge. The lower end of arm 51 is hinged at an intermediate position between the extremities of the lower arm 53 of toggle 50, the lower end of arm 53 in turn being hinged to bracket 54 secured to base 10 forward of screen assembly 40. The upper end of arm 53 is provided with a transverse tang 55 which engages notch 52 when toggle 50 and screen assembly 40 are in closed position, thus maintaining the latter position until toggle 50 is broken by means hereafter described in connection with the master reader and by alternate means to be described in connection with the teller reader.

*The passbook*

The passbook, generally indicated at 60, is of the usual kind having several pages 61 bound between front and rear covers 62 and 63. On the inside of the latter, a reference frame 64 is imprinted within whose boundaries print 65 of the encoded signature is bonded (see FIGURE 5). Just below the latter, at the inner edges of the inner edges of the sides of frame 64, two spaced initial or trial aligning apertures 66 through cover 63 are provided so that an initial or trial alignment of encoding 65 relative to screen 42 can readily be made in the master reader by final aligning assembly 14. After the latter adjustment the second or final set of aligning apertures 67 (see FIGURE 5) is produced by means hereafter detailed in connection with the following description of the master reader itself.

*The master reader*

Referring now to FIGURES 2 through 5 in particular, the mechanism peculiar to the master reader itself will now be described. This mechanism encompasses the initial or trial aligning assembly on the one hand, and the punch assembly for producing the final aligning apertures 67 in the passbook on the other hand, together with coordinate mechanism for opening and closing screen assembly 40. The initial or trial aligning mechanism comprises essentially an aligning pin guide 69 secured to base 10 just in front of and across the mid portion of screen assembly 40. Pin guide 69 is an integral structure composed of pillow blocks 70 having upstanding bosses 71 at their forward ends connected by web 72. The lateral spacing of bosses 71 is slightly greater than the spacing of apertures 66 in passbook 60 and bosses 71 are bored to slideably receive a pair of parallel aligning pins 73 which are horizontally spaced so that when slid forward in their bores they will project appropriately between the bottom of screen 42 and frame 41 and engage apertures 66 of passbook 60 when the latter is suitably inserted between guides 44 and seated lightly atop floor plate 35. The forward ends of pins 73 are rounded and are received in pin seats 73' in the forward face of anvil 74. The latter is a generally rectangular block secured transversely to base 10 beneath cushion 30 and undercut so that its forward face both overhangs the rear half of floor plate 35 and is substantially flush with the surface of covering 33. The rear ends of pins 73 are fixed in the sides of an inverted U-shaped operating head 75. The latter straddles and is slideable on a rectangular punch head 76 which in turn is slideable on pillow blocks 70. From head 76 a pair of parallel, cylindrical punches 77 project horizontally forward just inboard of and level with pins 73 through suitable bores in bosses 71 in which they are slideably movable to engage die bores 77' also in the face of anvil 74. Punches 77 thus enable the final set of aligning apertures 67 to be made in passbook cover 63 when appropriately inserted between guides 44 and screen assembly 40 is thereafter moved to its closed position. A stripper plate 78, adjustably attached to web 72, extends forward under screen 42 and is provided with downwardly turning fingers 79 which straddle pins 73 and punches 77 to prevent any tendency of either, upon their withdrawal from apertures 66 or 67, to pull passbook 60 forward under screen 42.

Aligning pins 73 are moved to engage apertures 66 by a manually operated mechanism which also closes screen assembly 40 at the same time. A link 80 is pivoted at one end between a pair of angle brackets 81 extending out horizontally from the rear face of aligning pin head 75 and at its other end to the upper end of an offset crank arm 82. The latter inclines downwardly and is fixed at its other end to the inner end of crank shaft 83 extending across base 10 to one side thereof and carried in spaced journals 84 secured to base 10. The outer end of crank shaft 82 is fitted with a two-piece crank arm 85 extending generally upward therefrom and provided with a handle 86 at its upper end. Intermediate crank arm 85 is pivoted one end of operating arm 87 having a lost-motion slot 88 along which pivot 89, which connects the other end of arm 87 to toggle arm 53 between the pivot points of the latter, is slideable. Slot 88 is sized so that (1) upon movement of crank arm 85 in the direction of the arrows in FIGURES 2 and 3, slideable movement of arm 87 relative to pivot 89 will be arrested by the rear end of slot 88 so that lower toggle arm 53 will thenceforth be moved to close toggle 50 and thus screen assembly 40 as crank arm 82 at the same time moves aligning pins 73 forward to engage their seats 73′ in anvil 74, and (2) upon return of crank arm 85 by extensible coil spring 90 suitably interposed between the upper portion of crank arm 85 and base 10, thus withdrawing aligning pins 73, pivot 89 will merely slide forward in slot 88 and so maintain toggle 50 and screen assembly 40 in their closed positions. The extent of the return of crank arm 85 is governed by a suitable adjustable bumper 91 projecting horizontally rearward from angle bracket 92 secured to base 10 to engage the adjacent edge of crank arm 85.

Toggle 50 and screen assembly 40 are opened by a mechanism now to be described. A horizontal operating rod 100, slideable fore and aft in angle brackets 101 secured to base 10 is positioned just inboard of toggle 50 and crank arm 85. Adjacent the front end of rod 100, a pin 102 extends horizontally outboard therefrom and is engageable with a pin 103 depending from the lower edge of trip 104. The latter is in the form of a rectangular block which in turn is pivoted at its midpoint, to be swingable thereabout in a vertical plane, to an upright angle bracket 105 fixed to base 10 inboard of the forward end of rod 100. An extensible coil spring 106, interposed between an overhanging tang 107 at the top of bracket 105 and the upper end of trip 104, tends to position the latter so that pin 103 is vertical. When rod 100 is moved from the position shown in FIGURE 3 in the direction indicated by arrow A in that figure, pin 102 engages pin 103 thus rotating trip 104 against spring 106. Between pin 103 and the pivot of trip 104, a trip pin 108, extending horizontally outward from trip 104, engages the back edge of toggle arm 53 as rod 100 continues in direction A, thus moving toggle arm 53 away from screen assembly 40 and opening toggle 50. Continued movement of rod 100 in direction A causes pin 103 to ride up and over pin 102, thus permitting spring 106 to return trip 104 to its static position. Movement of rod 100 in direction B indicated in FIGURE 3 reverses the foregoing sequence but does not disturb toggle 50, inasmuch as trip pin 108 is then swung away from engagement with toggle arm 53, but merely returns pin 103 to its position relative to pin 102 shown in FIGURE 3.

The movement of operating rod 100 is controlled by a horizontal link bar 110 having a slot 111 in one end thereof in which rides a pin 112 upstanding from operating rod 100 between brackets 101. An intermediate slot 113 in bar 110 engages a pivot pin 114 secured adjacent the rear end of the upper face of a longitudinally extending inverted rack 115, which at its forward end is secured to the rear face of punch head 76 and slides to and fro in order to operate punches 117 in an inverted U-shaped bracket 116 secured to base 10. The remaining end of bar 110 is pivoted at 117 atop a pillow block 118 fixed to base 10. A pinion gear 119 (see FIGURE 4) engages rack 115 and is secured to the inner end of crank shaft 120 which extends across base 10 to the side of the latter opposite crank arm 85 and is carried in transversely spaced journals 121 fixed to base 10. A two-piece crank arm 122, similar to crank arm 85, extends generally upward from the outer end of crank shaft 120 and is provided with a suitable handle 123 at its upper end. It will be apparent, therefore, that as crank arm 122 is moved to the position shown in broken lines in FIGURE 2, pinion 119 will move rack 115 and punches 77 forward to engage die bores 77′. At the same time link bar 110 will also be moved to the position shown in broken lines in FIGURE 2, thus moving operating rod 100 also forward causing pin 103 to ride over pin 102 and assume the position illustrated in FIGURE 3. Return of crank arm 122 by extensible coil spring 124 fixed between outer journal 121 and the adjacent side of frame 41 withdraws punches 77 and causes trip pin 108 to open screen assembly 40 in the manner heretofore described. The return position of rack 115 is controlled by means of a suitable adjustable stop 125 projecting horizontally from angle block 126 fixed to base 10 to engage the rear end face of rack 115. Several alternate positions 127 may be provided in link bar 110 for pivot 117 in order to adjust the extent of movement of rod 100 relative to that of rack 115.

Finally, an upstanding lamp bracket 128 is secured to base 10 at one side of bracket 126 and carries lamp socket 129 on angle arm 130 so that the lamp (not shown) when inserted in socket 129 will extend horizontally therefrom directly opposite screen 42. Socket 129 is connectable through a suitable line cord and switch (not shown) to an appropriate source of electric power.

*The teller reader*

The teller reader, in addition to the common subassemblies heretofore described, incorporates an aligning pin guide 140, similar to guide 69, secured to base 10 midway in front of screen assembly 40. Bosses 141 of guide 140, connected by an integral web 142, are bored to slideably receive a pair of parallel aligning pins 143 of the same diameter as punches 77, rounded at their forward ends, and horizontally spaced apart equal to the spacing of apertures 67 in passbook 60. Pins 143 are forwardly movable in their bores through the space beneath screen 42 to engage pin seats 144 in anvil 145, identical in shape and position with anvil 74 in the master reader. The rear ends of aligning pins 143 are secured in a rectangular operating head 146, slideable on base 10, between which and bosses 141 pins 143 are encompassed by compressible coil springs 147 to bias pins 143 to their withdrawn position. A stripper plate 148, similar to plate 78, is adjustably secured to web 142 and is provided with fingers 149 straddling pins 143 which extend forward in the same manner and for the same purpose as fingers 79 of plate 78.

Midway along the front end of base 10 a mechanism is provided in order to tilt the teller reader relative to the table or counter upon which it is used. This mechanism comprises a movable rack 150, frictionally engaged by guideway 151, extending vertically down through base 10 and operated by pinion 152 at one end of pinion shaft 153, the latter extending horizontally outwardly beyond the front edge of base 10 and provided with a knob 154 on its outer end. Pinion shaft 153 is carried by an upright angle plate 155 secured to base 10 just inside its front edge. Finally, an extensible coil spring 156 is attached at one end to one side of frame 141 and at its other end to base 10 forward of frame 141 in order to bias screen assembly 40 to its open position.

Turning next to the electrical components of the teller reader, a solenoid L1 is secured to base 10 just behind operating head 146 with its armature 160 connected to the latter so that when L1 is energized head 146 and aligning pins 143 are moved forward against springs 147 to engage seats 144 in anvil 145. At each side of bosses 141 a pair of single pole, single throw microswitches S1 and S2 are secured having spring contacts 161 biased in circuit open position which extend forward under screen 42 and the opposite ends of floor plate 35 so that when the ends the the latter are equally depressed by insertion of passbook 60, switches S1 and S2 will both be closed. Directly behind S1 and S2 are positioned a second pair of single pole, single throw microswitches S3 and S4 having spring contacts 163 biased in circuit open position. Contacts 163 extend forward past the lateral ends of head 146, having opposite the latter shallow, upturned depressions 164 therein which underlie a pair of horizontal pins 165 extending thereacross from the lateral ends of head 146, so that when L1 is energized and head 146 is thus moved forward, pins 165 will cam contacts 163 downwardly and close S3 and S4. At one side of base 10 behind frame 41, a single pole, double throw microswitch S5 is secured to base 10 and is provided with a spring biased contact 166 extending upwardly to slideably engage the back side of frame 141 so that upon movement of the latter between its open and closed positions contact 166 also moves between its two closed positions.

Along the side of base 10 to the rear of toggle 50 a pair of solenoids L2 and L3 are positioned in tandem in push-pull relation to screen assembly 40 with their armatures 167 and 168 respectively operatively opposing each other and connected by rod 169. Armature 168 in turn is pivotally joined to one end of toggle operating link 170 whose other end is pivoted in turn to toggle arm 53 between the pivot points of the latter with toggle arm 51 and bracket 54. Solenoids L2 and L3 thus provide means for respectively closing and opening toggle 50 and thus screen assembly 40, depending upon whether one or the other is energized.

A forwardly inclined control panel 171 is horizontally suspended along the front of base 10 above rack 150 upon angle brackets 172 straddling the latter and plate 155 and is additionally braced by bracket 173 extending therefrom rearwardly to base 10. Panel 171 carries a single pole, single throw line switch S6, a pilot light P1 and a single pole, double throw switch S7 of the push button type having a spring contact biased to one of its two closed positions. One of brackets 172 in turn carries line fuse F1 and a single pole, single throw time delay relay tube T1 which is of the thermally operated type having its contacts normally in closed position. A bracket 174 extending rearwardly from panel 171 carries a horizontal screen lamp P2 positioned directly opposite screen 42. Finally, a suitable terminal board 175, wiring harness clamps 176 and line cord and plug 177, connectable to a suitable source of electrical power, are provided along one side of base 10.

Figure 7:
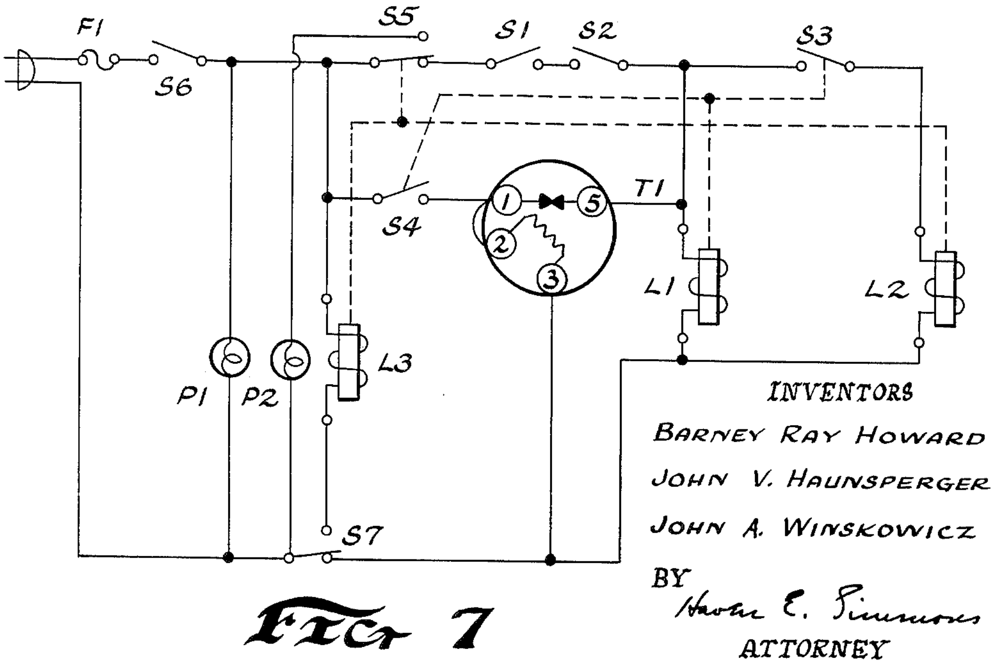
FIGURE 7 is a schematic diagram of the electric circuitry of the teller reader.

Referring now to FIGURE 7 which illustrates the positions of switches S1, S2, S3, S4, S5 and S7 when screen assembly 40 is at its open position and no passbook is inserted in the reader, it will be observed that fuse F1 and pilot lamp P1 are connected in series with line cord 177 and switch S6. In series with the latter are also connected: (1) solenoid L1 through switches S1, S2, S5 and S7, and solenoid L2 through the latter switches and switch S3; (2) screen lamp P2 through the alternate position of switch S5; (3) solenoid L3 through the alternate position of switch S7; and (4) the heater element of tube T1 through switch S4. Switch S4 and the thermally operated contacts in tube T1 are connected in series with each other and together are connected in parallel with switches S1, S2 and S5.

*The housing*

Both the master and teller readers are provided with an integral housing or cover 180, molded of fiberglass or other suitable material, which is of generally rectangular shape with its top 181 sloping gently forward. In the latter at each side adjacent the rear are provided two oppositely facing bosses 182 and 182' integral therewith and apertured to receive adjusting screws 17 and 17' respectively therethrough. Just forward of bosses 182 and 182', top 181 is provided with a somewhat inverted T-shaped cutout 183 through which the upper portion of pressure plate assembly 26 projects and passbook 60 may be inserted between guides 44. Forwardly of cutout 183 is provided a centrally located, rectangular window 184, generally covered with a piece of plate glass, so that decoding screen 42 may be easily visible therethrough. Depending from the periphery of window 184 is a lamp box 185 whose front and rear walls are apertured at 186 and 187 to permit light from the screen lamps of the master or teller readers, as the case may be, to fall directly upon decoding screen 42. At each side of window 184 is located a narrow, longitudinally extending depression 188 molded in top 181 which is cut out when cover 180 is used for the master reader in order for crank arms 85 and 122 to project therethrough but is left blanked over when cover 180 is used for the teller reader. Likewise top 181 is provided across the front end thereof with a similar molded depression 189 which is cut out only for use with the teller reader in order to expose control panel 171 therethrough. Finally, the lower mid portion of the front wall of cover 180 is provided with a narrow upstanding depression 190 molded therein and extending to the bottom edge thereof which is cut out in the case of the teller reader so that elevating knob 154 may protrude therefrom.

*Operation of the master reader*

After the print of the encoded signature has been bonded within frame 64 of passbook 60, cover 63 thereof is inserted between guides 44 on compressor frame 41 and its edge is seated on floor plate 35. Crank arm 85 is then moved forward thus causing operating arm 87 to close toggle 50 and screen assembly 40 in the manner heretofore described. At the same time, crank arm 82 on crank shaft 83 causes link 80 to move aligning pins 73 forward in their bores in bosses 71 to engage initial aligning apertures 66 in cover 63 and finally seats 73' in anvil 74, whereupon cover 63 will be compressed between pressure plate assembly 26 and the back of decoding screen 42 in initial alignment with the latter owing to the engagement of aligning pins 73 with apertures 66. Crank arm 85 is then released and returned to its original position by spring 90 but does not disturb toggle 50 owing to the lost motion slot 88 in operating arm 87. The screen lamp in socket 129 is switched on and the alignment of decoding screen 42 with the scrambled signature on cover 63 is checked. Any misalignment is then corrected by a combination of rotation of knobs 19, 19' and pressure plate assembly 26 about its axis by lateral movement of grip 29. Rotation of knob 19 moves plate carrier 20, and thus plates 22, 22' and pressure plate assembly 26, as a unit in a linear direction relative to screen 42 in a plane parallel to the latter. Rotation of knob 19' on the other hand moves plate carrier 20' and thus plate 22' and pressure plate assembly 26 as a unit relative to both plate 22 and screen 42 in a plane parallel to the latter, but in a linear direction at right angles to that caused by rotation of knob 19. Accordingly, owing to the frictional engagement of covering 33 on cushion 30 with the back of passbook 60, the latter can be moved relative to screen 42 along any one of an infinite number of rectangular coordinates. Rotation of pressure plate assembly 26 about its axis by lateral movement of grip 29 causes passbook 60 to be skewed relative to screen 42 at any position of the former resulting from rotation of knobs 19 and 19'.

Once "maximum read" is achieved in the foregoing manner, crank arm 122 is operated thus causing rack 115 to move punches 77 forward to provide the second or final set of aligning apertures 67 in passbook 60. By the time apertures 67 have been punched, link bar 110, owing to movement of rack 115, has in turn moved operating rod 100 forward thus causing pin 103 to ride up and over pin 102. When crank arm 122 is returned to its original position causing rack 115 to withdraw punches 77 and link bar 110 to withdraw operating rod 100, pin 102 of the latter rotates trip 104 and trip pin 108 against toggle arm 53, thus opening toggle 50 and permitting spring 127 to return screen assembly 40 to its open position, whereupon passbook 60 can be removed ready for use.

*Operation of the teller reader*

After its decoding screen 42 is adjusted to bear the same relation to its aligning pins 143 as the screen in the master reader bears to punches 77 thereof, the teller reader is placed handily adjacent the teller with line cord 177 plugged into a suitable outlet and line switch S6 turned on, thus lighting pilot lamp P1. Upon presentation by the customer, passbook 60 containing an encoded signature 65 and final aligning apertures 67 in its rear cover 63 is inserted between guides 44 until the edge of cover 63 strikes floor plate 35. If passbook 60 is properly inserted, that is, if it is not cocked at an angle, floor plate 35 will be uniformly depressed, thereby closing switches S1 and S2 and activating solenoid L1. The latter then moves operating head 146 and aligning pins 143 forward against springs 147 to engage apertures 67 in cover 63 proceeding therethrough into seats 144 in anvil 145. At the same time, the forward movement of head 146 causes pins 165 to cam contacts 163 downward, thus closing switches S3 and S4. The closing of switch S3 completes the circuit to solenoid L2, whereupon its armature 167 and rod 169, armature 168 and toggle operating link 170 move forward as a unit to close toggle 50 and rotate screen assembly 40 to its closed position, compressing cover 63 between the back side of screen 42 and cushion 30. The closing of screen assembly 40 in turn moves contact 166 of switch S5 to its alternate position, thus lighting screen lamp P2 and opening the circuit to solenoid L2 to de-energize the latter. The circuit to solenoid L1, however, is maintained through the closed contacts of relay tube T1, owing to the closure of switch S4 which also energizes the heater circuit of relay tube T1 at the same time. Relay tube T1 is calibrated to open about 4 seconds after its heater circuit is energized so that there is a period after the closing of screen assembly 40 during which aligning pins 143 remain engaged with apertures 67.

The purpose of delaying the return of aligning pins 143 is to insure that the teller has sufficient time to remove his hand from the passbook as it is being compressed between screen 42 and cushion 30 before pins 143 are withdrawn. If the circuit to solenoid L1 is opened at the same time as that to solenoid L2 by switch S5, the teller's hand is often not yet removed from passbook 60, thus permitting the alignment thereof with screen 42 to be disturbed after withdrawal of aligning pins 143. The few seconds delay in de-energizing solenoid L1 allows the teller's hands to be well clear of the passbook before aligning pins 143 are withdrawn owing to the fact that when the contacts in relay tube T1 open, both circuits to solenoid L1 are therefore broken, permitting springs 147 to return aligning pins 143, operating head 146 and armature 160 to their initial position. The return of operating head 146 also reopens switches S3 and S4, the latter thus de-energizing the heater circuit of relay tube T1.

The teller then proceeds to compare the encoded signature 65, now decoded by screen 42, with that upon the withdrawal slip handed him by the customer. By rotation of knob 154 the teller can tilt the reader so that screen 42 can be viewed at the most suitable angle. If for any reason, particularly owing to wear and tear upon apertures 67 of passbook 60, aligning pins 143 have not produced a "maximum read" of the signature, the passbook can be realigned relative to screen 42 by rotation of knobs 19, 19' and pressure plate assembly 26 in the same manner as described in connection with the operation of the master reader. Once the teller has made a satisfactory comparison between the encoded signature 65 in passbook 60 and that shown on the withdrawal slip, he presses switch S7 on control panel 171 to its alternate position, thus energizing solenoid L3 and moving its armature 168 together with armature 167, rod 169 and toggle operating link 170 in the opposite direction, opening toggle 50 whereupon spring 156 returns screen assembly 40 to its open position, permitting withdrawal of passbook 60 from the reader and its return to the customer. The opening of screen assembly 40 also opens the circuit to screen lamp P2 by permitting contact 166 of switch S5 to return to its normal position. The teller reader is then ready for another operation.

It will be understood that though the invention has been described with particular reference to the accompanying drawings and detailed descriptive language has been employed, no limitation of the invention is thereby intended. Various changes and alterations are contemplated such as would ordinarily occur to one of ordinary skill in the art to which the invention relates so that the following claims are to be read in that light.

We claim:

1. Reader apparatus for use with equipment of the kind described including a sheet bearing encoded matter on one side thereof and a decoding screen, said apparatus comprising a sheet support adapted to engage the other side of said sheet at least over the area thereof corresponding to the area of the encoded matter on said one side thereof; a screen carrier adapted for attachment of said screen thereto so that said screen when attached is operable to decode the matter on said sheet, said carrier having an open position so that when said screen is attached thereto said sheet may be inserted for decoding between said support and the back face of said screen and movable relative to said support to a closed position so that said sheet is compressed between said support and the back face of said screen; means adapted to engage said sheet when inserted for decoding as aforesaid in order to produce an initial decoding alignment of said sheet with said screen when said carrier is moved to its closed position; and means to move said sheet when inserted for decoding as aforesaid and said carrier is in its closed position relative to and in a plane parallel with said screen in order to produce a final decoding alignment of said sheet with said screen.

2. Reader apparatus for use with equipment of the kind described including a sheet bearing encoded matter on one side thereof and having a plurality of spaced aligning apertures therethrough adjacent said encoded matter and a decoding screen, said apparatus comprising a sheet support adapted to engage the other side of said sheet at least over the area thereof corresponding to the area of the encoded matter on said one side thereof; a screen carrier adapted for attachment of said screen thereto so that said screen when attached is operable to decode the matter on said sheet, said carrier having an open position so that when said screen is attached thereto said sheet may be inserted for decoding between said support and the back face of said screen and movable relative to said support to a closed position so that said sheet is compressed between said support and the back face of said screen; a plurality of aligning members adapted to engage said apertures in said sheet when inserted for decoding as aforesaid and said carrier is in its open position in order to produce an initial decoding alignment of said sheet with said screen when said carrier is thereafter moved to its closed position, said members being disengageable from said apertures when said sheet is compressed between said screen and support; and means to move said sheet when inserted for decoding as aforesaid and said carrier is in its closed position relative to and in a plane parallel with said screen in order to produce a final decoding alignment of said sheet with said screen after disengagement of said members.

3. Reader apparatus for use with equipment of the kind described including a sheet bearing encoded matter on one side thereof and having a plurality of spaced aligning apertures therethrough adjacent said encoded matter and a decoding screen, said apparatus comprising a sheet support adapted to engage the other side of said sheet at least over the area thereof corresponding to the area of the encoded matter on said one side thereof; a screen carrier adapted for attachment of said screen thereto so that said screen when attached is operable to decode the matter on said sheet, said carrier having an open position so that when said screen is attached thereto said sheet may be inserted for decoding between said support and the back face of said screen and movable relative to said support to a closed position so that said sheet is compressed between said support and the back face of said screen; a plurality of aligning members adapted to engage said apertures in said sheet when inserted for decoding as aforesaid and said carrier is in its open position in order to produce an initial decoding alignment of said sheet with said screen when said carrier is thereafter moved to its closed position, said members being disengageable from said apertures when said sheet is compressed between said screen and support; means first to cause engagement of said members with said apertures when said sheet is inserted for decoding as aforesaid and said carrier is in its open position and then to move said carrier to its closed position; and means to move said sheet when inserted for decoding as aforesaid and said carrier is in its closed position relative to and in a plane parallel with said screen in order to produce a final decoding alignment of said sheet with said screen after disengagement of said members.

4. Reader apparatus for use with equipment of the kind described including a sheet bearing encoded matter on one side thereof and a decoding screen, said apparatus comprising a sheet support adapted to engage the other side of said sheet at least over the area thereof corresponding to the area of the encoded matter on said one side thereof; a screen carrier adapted for attachment of said screen thereto so that said screen when attached is operable to decode the matter on said sheet when inserted and compressed between said support and the back face of said screen in decoding relation to the latter, said carrier having an open position so that when said screen is attached thereto said sheet may be inserted for decoding as aforesaid and movable relative to said support to a closed position so that said sheet is compressed between said support and screen as aforesaid; and means adapted to engage said sheet when inserted for decoding as aforesaid in order to produce a decoding alignment of said sheet with said screen when said carrier is in its closed position.

5. Reader apparatus for use with equipment of the kind described including a sheet bearing encoded matter on one side thereof and a decoding screen, said apparatus comprising a plate adapted to engage the other side of said sheet at least over the area thereof corresponding to the area of the encoded matter on said one side thereof; a screen carrier adapted for mounting of said screen thereon so that it is operable to decode the matter on said sheet when the latter is inserted and compressed between said plate and the back face of said screen for decoding, one of said carrier and plate being movable relative to the other to an open position so that when said screen is mounted on said carrier said sheet may be inserted as aforesaid and to a closed position so that said sheet is compressed between said plate and screen as aforesaid; means adapted to engage said sheet when inserted as aforesaid in order to produce an initial decoding alignment of said sheet with said screen when said carrier and plate are in their closed position; and means to move said sheet when inserted for decoding as aforesaid and said carrier and plate are in their closed position relative to and in a plane parallel with said screen in order to produce a final decoding alignment of said sheet with said screen.

6. Reader apparatus for use with equipment of the kind described including a passbook or the like having a page bearing encoded matter on one side thereof and a decoding screen, said apparatus comprising a pressure plate adapted to engage the other side of said page at least over the area thereof corresponding to the area of the encoded matter on said one side thereof; an apertured compressor frame adapted for mounting of said screen in the aperture thereof so that it is operative to decode the matter on said page when inserted and compressed between said plate and the back face of said screen in decoding relation to the latter, said frame being hinged adjacent said plate for movement about its hinge axis relative to said plate to an open position so that when said screen is mounted on said frame said page may be inserted as aforesaid and to a closed position so that said page is compressed between said plate and screen as aforesaid; means adapted to engage said page when inserted as aforesaid in order to produce an initial decoding alignment of said page with said screen when said frame is moved to its closed position; and means to move said page when inserted for decoding as aforesaid and said frame is in its closed position relative to and in a plane parallel with said screen in order to produce a final decoding alignment of said page with said screen.

7. Reader apparatus for use with equipment of the kind described including a passbook or the like having a page bearing encoded matter on one side thereof with a plurality of spaced aligning apertures therethrough adjacent said encoded matter and a decoding screen, said apparatus comprising a pressure plate adapted to engage the other side of said page at least over the area thereof corresponding to the area of the encoded matter on said one side thereof; a compressor frame adapted for mounting of said screen thereon so that it is operative to decode the matter on said page when inserted and compressed between said plate and the back face of said screen in decoding relation to the latter, said frame being hinged adjacent said plate for movement about its hinge axis relative to said plate to an open position so that when said screen is mounted on said frame said page may be inserted as aforesaid and to a closed position so that the page is compressed between said plate and screen as aforesaid; a plurality of aligning members adapted to engage said apertures in said page when inserted as aforesaid and said frame is at its open position in order to produce an initial decoding alignment of said page with said screen when said frame is thereafter moved to its closed position said members being disengageable from said apertures when said sheet is compressed between said plate and screen; means first to cause engagement of said members with said apertures when said page is inserted for decoding as aforesaid and then to move said frame to its closed position; and means to move said page when inserted for decoding as aforesaid and said frame is in its closed position relative to and in a plane parallel with said screen in order to produce a final decoding alignment of said page with said screen after disengagement of said members.

8. Master reader apparatus for use with (1) a passbook or the like containing encoded matter of the kind described on a page thereof and (2) a decoding screen of the kind described, said apparatus comprising a pressure plate adapted to engage the back of said page over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, said frame having an open position so that when said screen is mounted thereon said page may be inserted as aforesaid and movable relative to said plate to a closed position so that said page is compressed between said plate and screen as aforesaid for decoding; means adapted to engage said page when inserted for decoding as aforesaid in order to produce a trial decoding alignment of said page with said screen when said frame is moved to its closed position; means to move said page when inserted for decoding as aforesaid and said frame is in its closed position relative to and in a plane parallel with said screen in order to produce a final decoding alignment of said page with said screen; a punch assembly including a set of spaced punches movable after final decoding alignment to punch a final set of aligning apertures in said page adjacent the encoded matter thereon while said frame is in its closed position.

9. Master reader apparatus for use with (1) a passbook or the like containing encoded matter of the kind described on a page thereof together with a set of spaced aligning apertures therethrough adjacent said encoded matter and (2) a decoding screen of the kind described, said apparatus comprising a pressure plate adapted to engage the back of said page at least over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, one of said frame and plate being movable relative to the other to an open position so that when said screen is mounted thereon said page may be inserted as aforesaid and to a closed position so that said page is compressed between said plate and screen as aforesaid; a set of spaced aligning members movable to engage said apertures in said page when inserted as aforesaid and said frame is at its open position in order to produce a trial decoding alignment of said page with said screen when said frame is thereafter moved to its closed position, said members being disengageable from said apertures when said page is compressed between said screen and plate as aforesaid and said plate being both movable in two transverse directions in a plane parallel with and skewable about an axis perpendicular to said screen in order to produce when said page is inserted for decoding and said frame is in its closed position a final decoding alignment of said page with said screen after disengagement of said aligning members; a punch assembly including a set of spaced punches movable after said final decoding alignment to punch a final set of aligning apertures in said page adjacent the encoded matter thereon while said frame is in its closed position.

10. Master reader apparatus for use with (1) a passbook or the like containing encoded matter of the kind described on a page thereof together with a pair of spaced aligning apertures therethrough adjacent said encoded matter and (2) a decoding screen of the kind described, said apparatus comprising a pressure plate adapted to engage the back of said page over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, said frame being hinged adjacent said plate for movement about its hinge axis relative to said plate to an open position so that when said screen is mounted on said frame said page may be inserted for decoding as aforesaid and to a closed position so that said page is compressed between said plate and screen as aforesaid; a plurality of aligning members adapted to engage said apertures in said page when inserted as aforesaid and said frame is at its open position in order to produce a trial decoding alignment of said page with said screen when said frame is thereafter moved to its closed position, said members being disengageable from said apertures when said page is compressed between said screen and plate as aforesaid; means first to move said aligning members into engagement with said apertures and then to move said frame to and retain it in its closed position; means to move said page when inserted for decoding as aforesaid and said frame is in its closed position relative to and in a plane parallel with said screen in order to produce a final decoding alignment of said page with said screen after disengagement of said aligning members; and a punch assembly including a pair of spaced punches movable after said final decoding alignment to punch a final pair of aligning apertures in said page adjacent the encoded matter thereon while said frame is in its closed position and to be then withdrawn from engagement with said page, including means to return said frame to its open position upon disengagement of said punches from said page.

11. Master reader apparatus for use with (1) a passbook or the like containing encoded matter of the kind described on a page thereof together with a set of spaced aligning apertures therethrough adjacent said encoded matter and (2) a decoding screen of the kind described, said apparatus comprising a pressure plate adapted to engage the back of said page over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, said frame having an open position so that when said screen is mounted thereon said page may be inserted as aforesaid and movable relative to said plate to a closed position so that said page is compressed between said plate and screen as aforesaid for decoding; a set of spaced aligning members movable to engage said apertures in said page when inserted as aforesaid and said frame is at its open position in order to produce a trial decoding alignment of said page with said screen when said frame is thereafter moved to its closed position, said members being disengageable from said apertures when said page is compressed between said screen and plate as aforesaid and said plate and page, when inserted for decoding as aforesaid and said frame is in its closed position, being together movable relative to and in a plane parallel with said screen in order to produce a final decoding alignment of said page with said screen after disengagement of said aligning members; a punch assembly including a set of spaced punches movable after said final decoding alignment to punch a final set of aligning apertures in said page adjacent the encoded matter thereon while said frame is in its closed position.

12. Master reader apparatus for use with (1) a passbook or the like containing encoded matter of the kind described on a page thereof together with a pair of spaced aligning apertures therethrough adjacent said encoded matter and (2) a decoding screen of the kind described, said apparatus comprising a base; a pressure plate fixed to said base and adapted to engage the back of said page over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, said frame being hinged to said base adjacent said plate for movement about its hinge axis relative to said plate to an open position so that when said screen is mounted on said frame said page may be inserted for decoding as aforesaid and to a closed position so that said page is compressed between said plate and screen as aforesaid; a plurality of aligning members adapted to engage said apertures in said page when inserted as aforesaid and said frame is at its open position in order to provide a trial decoding alignment of said page with said screen when said frame is thereafter moved to its closed position, said members being disengageable from said apertures when said page is compressed between said screen and plate as aforesaid; means first to move said aligning members into engagement with said apertures and then to move said frame to and retain it in its closed position, said means including a toggle linkage interposed between said frame and base and a lost motion arm operatively associated with said linkage and said members to engage and close said toggle and frame after said members have engaged said apertures and to permit disengagement of said members from said apertures without opening said toggle; means to move said page when inserted for decoding as aforesaid and said frame is in its closed position relative to and in a plane parallel with said screen in order to produce a final decoding alignment of said page with said screen after disengagement of said aligning members; a punch assembly including a pair of spaced punches movable after said final decoding alignment to punch a final pair of aligning apertures in said page adjacent the encoded matter thereon while said frame is in its closed position and to be then withdrawn from engagement with said page, including means to open said toggle and return said frame to its open position upon disengagement of said punches from said page.

13. Teller reader apparatus for use with (1) a passbook ol the like containing encoded matter of the kind described on a page thereof and (2) a decoding screen of the kind described, said apparatus comprising a pressure plate adapted to engage the back of said page over the area thereof corresponding to the area of the encoded matter on the front thereof; an apertured compressor frame adapted for mounting of said screen in the aperture thereof so that it is operative to decole the matter on said page when inserted and compressed between said plate and the back face of said screen in decoding relation to the latter, said frame having an open position so that when said screen is mounted thereon said page may be inserted as aforesaid and movable relative to said plate to a closed position so that said page is compressed between said plate and screen as aforesaid for decoding; means adapted to engage said page when inserted for decoding as aforesaid in order to produce a decoding alignment of said page with said screen when said frame is moved to its closed position; means to move said frame to its closed position when said page is inserted for decoding as aforesaid, said means including a solenoid having an armature operatively connected with said frame to move the latter to its closed position when said solenoid is energized and a switch connected in series with said solenoid, said switch being arranged to be closed to energize said solenoid upon engagement of said page with said page engaging means; and means to move said page when inserted for decoding as aforesaid and said frame is in its closed position relative to and in a plane parallel with said screen so that the decoding alignment of said page with said screen can be adjusted.

14. Teller reader apparatus for use with (1) a passbook or the like containing encoded matter of the kind described on a page thereof together with a set of spaced aligning apertures therethrough adjacent said encoded matter and (2) a decoding screen of the kind described, said apparatus comprising a pressure plate adapted to engage the back of said page at least over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, one of said frame and plate being movable relative to the other to an open position so that when said screen is mounted thereon said page may be inserted as aforesaid and to a closed position so that said page is compressed between said plate and screen as aforesaid; a set of spaced aligning members movable to engage said apertures in said page when inserted as aforesaid and said frame is at its open position in order to produce a decoding alignment of said page with said screen when said frame is thereafter moved to its closed position, said members being disengageable from said apertures when said page is compressed between said screen and plate as aforesaid and said plate being both movable in two transverse directions in a plane parallel with and skewable about an axis perpendicular to said screen so that when said page is inserted for decoding and said frame is in its closed position the decoding alignment of said page with said screen after disengagement of said aligning members can be adjusted; and means to move said members into engagement with said apertures when said page is inserted for decoding and said frame and plate are in their open position as aforesaid, said means including a solenoid having its armature operatively associated with said members to move the latter into engagement with said apertures when said solenoid is energized and at least one switch connected in series with said solenoid, said switch being arranged to be closed by said page when inserted for encoding as aforesaid to energize said solenoid.

15. Teller reader apparatus for use with (1) a passbook or the like containing encoded matter of the kind described on a page thereof together with a pair of spaced aligning apertures therethrough adjacent said encoded matter and (2) a decoding screen of the kind described, said apparatus comprising a pressure plate adapted to engage the back of said page over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, said frame having an open position relative to said plate so that when said screen is mounted on said frame said page may be inserted for decoding as aforesaid and movable relative to said plate to a closed position so that said page is compressed between said plate and screen as aforesaid; an aligning assembly including a plurality of aligning members engageable with said apertures in said page, said assembly being movable to cause said engagement when said page is inserted as aforesaid and said frame is at its open position in order to produce a decoding alignment of said page with said screen when said frame is thereafter moved to its closed position and biased to return said members to their disengaged position when said page is compressed between said screen and plate as aforesaid; means first to move said aligning members into engagement with said apertures and then to move said frame to and retain it in its closed position, said means including a first solenoid having its armature operatively associated with said aligning assembly to move said aligning members into engagement with said apertures when said first solenoid is energized, a pair of switches connected in series with said first solenoid, each switch having a circuit making and breaking member arranged to be closed by contact of one of two spaced lower edge portions of said page when inserted for decoding as aforesaid with said circuit member of such switch so that said first solenoid is energized only when both of said switches are closed, a second solenoid having its armature operatively connected with said frame to move the latter to its closed position when said second solenoid is energized, and a third switch connected in series with said second solenoid, said third switch having a circuit making and breaking member arranged to be closed to energize said second solenoid by contact of its circuit member by said assembly when the latter has moved to cause said engagement of said aligning members with said apertures; and means to move said page when inserted for decoding as aforesaid and said frame is in its closed position relative to and in a plane parallel with said screen so that the decoding alignment of said page with said screen can be adjusted after disengagement of said aligning members.

16. Teller reader apparatus for use with (1) a passbook or the like containing encoded matter of the kind described on a page thereof together with a pair of spaced aligning apertures therethrough adjacent said encoded matter and (2) a decoding screen of the kind described, said apparatus comprising a pressure plate adapted to engage the back of said page over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, said frame having an open position relative to said plate so that when said screen is mounted on said frame said page may be inserted for decoding as aforesaid and movable relative to said plate to a closed position so that said page is compressed between said plate and screen as aforesaid; an aligning assembly including a plurality of aligning members engageable with said apertures in said page, said assembly being movable to cause said engagement when said page is inserted as aforesaid and said frame is at its open position in order to produce a decoding alignment of said page with said screen when said frame is thereafter moved to its closed position and biased to return said members to their disengaged position when said page is compressed between said screen and plate as aforesaid; means first to move said aligning members into engagement with said apertures and then to move said frame to and retain it in its closed position, said means including a first solenoid having its armature operatively associated with said assembly and aligning members to move the latter into engagement with said apertures when said first solenoid is energized, a second solenoid having its armature operatively connected with said frame to move the latter to its closed position when said second solenoid is energized, first and second switches connected in series with both of said solenoids, each switch having a movable circuit making and breaking member normally in open position arranged to be closed by contact of one of two spaced lower edge portions of said page when inserted for decoding as aforesaid with said circuit member of such switch, a third switch in series with said second solenoid only, said third switch having a movable circuit making and breaking member normally in its closed position arranged so that its circuit member is moved to its open position when said frame is in its closed position, a time delay switch connected in series with said first solenoid only, said delay switch being normally in closed position and thermally operable to an open position by electrically energized heater means, a fourth switch connected in series with said second solenoid only and a fifth switch connected in series with said heater means, both switches having movable circuit making and breaking members normally in their open position arranged to be closed to energize said second solenoid and said heater means respectively by contact of their respective circuit members by said assembly when said first and second switches are closed as aforesaid to energize said first solenoid and move said assembly to engage said aligning members with said apertures; and means to move said page when inserted for decoding as aforesaid and said frame is in its closed position relative to and in a plane parallel with said screen so that the decoding alignment of said page with said screen can be adjusted after disengagement of said aligning members.

17. Teller reader apparatus for use with (1) a passbook of the like containing encoded matter of the kind described on a page thereof together with a pair of spaced aligning apertures therethrough adjacent said encoded matter and (2) a decoding screen of the kind described, said apparatus comprising a base; a pressure plate fixed to said base and adapted to engage the back of said page over the area thereof corresponding to the area of the encoded matter on the front thereof; an apertured compressor frame adapted for mounting of said screen in the aperture thereof so that it is operative to decode the matter on said page when inserted and compressed between said plate and the back face of said screen in decoding relation to the latter, said frame being hinged to said base adjacent said plate for movement about its hinge axis relative to said plate to an open position so that when said screen is mounted on said frame said page may be inserted for decoding as aforesaid and to a closed position so that said page is compressed between said plate and screen as aforesaid; a plurality of aligning members adapted to engage said apertures in said page when inserted as aforesaid and said frame is at its open position in order to produce a decoding alignment of said page with said screen when said frame is thereafter moved to its closed position, said members being disengageable from said apertures when said page is compressed between said screen and plate as aforesaid; means to move said aligning members into engagement with said apertures; means to move said frame to and retain it in its closed position and then to optionally move said frame to its open position, said means including a toggle linkage operatively interposed between said frame and base, a pair of solenoids positioned in tandem in push-pull relation to said frame, said solenoids having a common armature operatively connected with said linkage so that when one of said solenoids is energized said frame and toggle are moved to their closed positions, and a manually operable switch connected in series with the other of said solenoids so that when said switch is closed said other solenoid is energized and said frame and toggle are moved to their open position; and means to move said page when inserted for decoding as aforesaid and said frame is in its closed position relative to and in a plane parallel with said screen so that the decoding alignment of said page with said screen can be adjusted after disengagement of said aligning members.

References Cited by the Examiner

UNITED STATES PATENTS

| | | | |
|---|---|---|---|
| 1,011,833 | 12/1911 | Newell | 283—63 |
| 1,911,994 | 5/1933 | Edwards | 35—2 |
| 2,689,751 | 9/1954 | Baller | 283—63 |
| 2,952,080 | 9/1960 | Avakian et al. | 35—3 |

EUGENE R. CAPOZIO, *Primary Examiner.*

NEIL C. READ, JEROME SCHNALL, *Examiners.*